(12) United States Patent
Van Laak (10) Patent No.: US 9,067,365 B2
(45) Date of Patent: Jun. 30, 2015

(54) POSITIONING DEVICE FOR A MANUAL WELDING MACHINE

(75) Inventor: Hermann Van Laak, Hunxe (DE)

(73) Assignee: Plasticon Germany GmbH, Dinslaken (DE)

( * ) Notice: Subject to any disclaimer, the term of this patent is extended or adjusted under 35 U.S.C. 154(b) by 802 days.

(21) Appl. No.: 13/322,759

(22) PCT Filed: May 31, 2010

(86) PCT No.: PCT/DE2010/000589
§ 371 (c)(1),
(2), (4) Date: Feb. 15, 2012

(87) PCT Pub. No.: WO2010/136024
PCT Pub. Date: Dec. 2, 2010

(65) Prior Publication Data
US 2012/0132372 A1    May 31, 2012

(30) Foreign Application Priority Data

May 29, 2009  (DE) .......................... 10 2009 023 219
Nov. 20, 2009 (DE) .......................... 10 2009 053 863

(51) Int. Cl.
| | |
|---|---|
| *B32B 37/00* | (2006.01) |
| *B29C 65/00* | (2006.01) |
| *B29C 65/14* | (2006.01) |
| *B29C 65/78* | (2006.01) |
| *B29C 65/16* | (2006.01) |

(52) U.S. Cl.
CPC ............... *B29C 66/861* (2013.01); *B29C 65/14* (2013.01); *B29C 65/1412* (2013.01); *B29C 65/1425* (2013.01); *B29C 65/1438* (2013.01); *B29C 65/1483* (2013.01); *B29C 65/1496* (2013.01); *B29C 65/16* (2013.01); *B29C 65/1619* (2013.01); *B29C 65/1687* (2013.01); *B29C 65/1696* (2013.01); *B29C 65/7847* (2013.01); *B29C 66/8161* (2013.01); *B29C 66/8163* (2013.01); *B29C 66/81267* (2013.01)

(58) Field of Classification Search
CPC  B29C 65/14; B29C 65/1496; B29C 65/7847; B29C 66/8161; B29C 66/8163; B29C 66/861
USPC ............................... 156/228, 580, 581, 583.1
See application file for complete search history.

(56) References Cited

U.S. PATENT DOCUMENTS

| | | | |
|---|---|---|---|
| 6,012,711 A * | 1/2000 | Cipolla ........................... | 269/21 |
| 6,083,333 A | 7/2000 | Van Beers et al. | |
| 7,698,829 B2 * | 4/2010 | Lutz ............................... | 33/503 |

FOREIGN PATENT DOCUMENTS

| | | |
|---|---|---|
| DE | 102006035250 A1 | 2/2008 |
| EP | 0995541 A2 | 4/2000 |

* cited by examiner

*Primary Examiner* — James Sells
(74) *Attorney, Agent, or Firm* — Michael Soderman (57) ABSTRACT

The invention relates to a positioning device (203) for a manual welding machine (300), particularly for a plastic welding machine, comprising at least one contact shield (16) associated with the manual welding machine (300) and a positioning ring (3) associated with the material to be welded. In order to perform precise welding and to prevent the subsequent slipping of the manual welding machine (300), according to the invention, the positioning ring (3) can be fixed to the material to be welded and a contact shield (16) that can be inserted in the positioning ring (3) transfers a pressure distributed evenly over the circumference to the materials to be welded, in order to allow secure welding over a large area.

15 Claims, 11 Drawing Sheets

POSITIONING DEVICE FOR A MANUAL WELDING MACHINE

The invention relates to a positioning device for a manual welding machine, particularly for a plastic welding machine, comprising at least one contact shield associated with the manual welding machine and a positioning ring associated with the material to be welded.

Generic manual welding machines are needed for welding, e.g., liner films for load-bearing structures such as containers, apparatus, ducts, housings, or columns made out of either metal, optionally with an only partially resistant coating, or plastic or GRP. As a general rule, the materials used herein are not acid-resistant or are impure; hence an acid- or base-resistant lining of the containers is required. A liner is also needed when working with corrosive gases or liquids and when the interior walls of the housing are exposed to these gases or liquids. In addition, liner materials are needed for high-purity containers (semiconductors) and for highly resistant containers (chemistry) as well as for columns and other apparatus (chemistry). To protect the load-bearing structure and particularly the walls from corrosion, the interior surfaces facing the flow regions are lined with plastic anti-corrosion films (liner material, inliner). To this end, use is made in particular of the plastic MFA, PFA, or FEP in film form, because this plastic provides sufficient anti-corrosion protection. In addition use is made of plastic materials that can be made into films and which are sufficiently resistant to chemicals.

In order to ensure complete anti-corrosion protection of the load-bearing structure, the latter is lined over its entire surface with liner materials, preferably plastic sheeting, wherein the liner materials are fastened to the interior surface of the load-bearing structure at various points by means of a plurality of attachment or fixing points. The required attachment or fixing points are attached to the interior wall of the load-bearing structure and are used for fastening, wherein provision is usually made of only a few attachment points per $m^2$. The attachment or fixing points known to the prior art consist of threaded bolts or similar metal parts, which are joined to the interior wall of the housing and provided for attaching the liner materials with the help of other aids. For example, the metal attachment or fixing points can be bolted, cemented, or welded to a metal interior wall of the housing. Alternatively, the use of plastic materials is conceivable, which are generally fastened in the same manner and wherein the choice of an attachment method depends on the material of the load-bearing structure. Plastic materials are generally more resistant to chemicals than are standard solutions using metals, hence the attachment points usually require additional, subsequent covering with a film if exposed, impure plastics or metal parts protrude into the interior of the structure. This requires effort that could be avoided.

The liner materials intended to be fastened must be permanently joined to the interior surface of the load-bearing structure, particularly because a sufficient holding strength is required due to, pressure fluctuations of the liquid or gaseous media that may be let into the load-bearing structure and the mechanical stresses induced thereby. Manual welding machines are used to weld the liner materials to the attachments and fixing points.

The attachment and fixing points used are composed of a plastic compatible substrate material that is preferably transparent to light and has a one-sided absorbing coating. The coating can optionally be configured as a two-sided coating or can be welded on in an intermediate step with, e.g., a manual welding machine in such a way that an attachment and fixing point can be used for attaching one or two inliners. The absorbing coating ensures that the electromagnetic radiation to be applied brings about a heating and that this energy input is transferred to the material of the attachment and fixing point or to the plastic materials to be attached, so that due to the resulting plastification a bond forms between the material of the attachment and fixing point and the inliners, wherein the material is designed as non-absorbing in the wavelength range of 300 to 2,500 nm and wherein an absorbing coating absorbs in the wavelength range of 150 to 2,500 nm, preferably 500 to 1,500 nm, and particularly preferably 800 to 1000 nm. The material used has a thickness of 1.0 to 5.0 mm, whereas the absorbing coating has a layer thickness of 0.05 to 0.5 mm, preferably 0.1 to 0.4 mm, and particularly preferably 0.2 to 0.3 mm. So that the inliners maintain a distance from one another, the material of the attachment and fixing points has a thickness of 1.0 to 10.0 mm, preferably 1.5 to 5.0 mm, and particularly preferably 2.0 to 4.0 mm so that a gap in the millimeter range is formed after a second inliner is applied.

The sole utilization of plastic for the attachment and fixing points avoids the problem of damage by corrosive gases due to permeation or by fluids due to leaks, wherein a high-strength and resistant bond is created by a welding of the attachment and fixing points to the inner surface of the load-bearing structure on the one hand and to the liner material on the other. Preference is given to welding by means of electromagnetic radiation, wherein the attachment and fixing points are composed of a plastic material and the inner surface of the load-bearing structure or the liner material is likewise composed of a plastic, so that in the case of sufficient compatibility, the plastic materials can be welded directly to one another. To this end, a corresponding portion of the plastic material used is provided with either an absorbing coating or enriched with absorbing particles. For a load-bearing structure made of, e.g., a metal or of a non-weldable plastic material such as GRP, an additional lining of the interior walls with a plastic layer is performed, which provides additional protection to the load-bearing structure on the one hand and is suitable for welding to the attachment and fixing points on the other. The plastic liner materials used can then be welded to the attachment and fixing points after the attachment of the latter elements so that a second inner inliner film is present in the respective structure in addition to the interior surface, said second film being composed of the liner material and arranged at a distance from the actual interior surface. If compatible plastic materials are used, the latter can be welded directly to one another, wherein the attachment and fixing points used are weldable by a first contact surface to the inner surface on the one hand and by a second contact surface to the liner material on the other. In principle any conceivable device capable of welding the plastic materials can serve as a manual welding machine.

Preference is given to manufacturing the attachment and fixing points from a plastic material that is transparent to light so that the plastic materials or the absorbing layer are weldable to the interior surface or to the liner material by means of electromagnetic radiation. To this end, preference is given to manufacturing the interior surface from a light-absorbing plastic material or to the use of an interior surface made of a plastic material with an additional absorbing coating. In contrast the liner material is made of a light-transmitting plastic material so that subsequent welding by means of, e.g., electromagnetic radiation is possible. In such a case the contact surface of the spacer can be provided with a light-absorbing layer, or use is made of a light-absorbing spacer configured so as to ensure the irradiation of the back contact surface to the interior surface.

These solutions ensure that the spacers are bondable to the interior surface and/or to the liner material by electromagnetic radiation, hence with welding it is possible to ensure a permanent bond as well as an efficient procedure.

For the wall surfaces and the liner material, use can be made of standard thermoplastics, preferably PE, PP, PE-UHMW, or partially fluorinated thermoplastics, preferably PVDF, E-CTFE, or highly fluorinated thermoplastics, preferably FEP, MFA, PFA, or modified PTFE, wherein the absorbing coating can consist of the same plastic materials or in the case of PE-UHMW and modified PTFE, of similar plastic materials.

The plastic materials available for use as liner materials in most cases have an especially smooth surface, hence the manual welding machines available for the welding can slip very easily and result in a poor welding. Preference is given to the position of the attachment and fixing points as a welding zone, which can be ca. 3 to 10 cm in size. After installation of the liner material, a precise welding of the attachment and fixing points to the liner material must be performed using a manual welding machine. To this end, a manual welding machine is placed on the liner material.

The object of the present invention is to simplify the handling of a manual welding machine considerably, and to enable a secure welding of the liner materials to the attachment and fixing points.

For achieving the object according to the invention, a positioning ring can be fixed to the material to be welded and a contact shield that can be inserted in the positioning ring transfers a pressure distributed evenly over the circumference to the materials to be welded. Other advantageous embodiments of the invention arise from the subordinate claims.

Depending on the kind of manual welding machine used, the liner material and particularly the attachment and fixing points behind the liner material are covered by the welding head provided, thus making precise positioning and further checking considerably difficult. There is also the danger that once it has been positioned, the manual welding machine may slip from the attachment and fixing point when the required contact pressure is applied, thus resulting in only a partial welding. With the positioning ring of the invention, which can be fixed beforehand to the material to be welded, and a contact shield, which can be inserted in the positioning ring and which is directly associated with the manual welding machine, a pressure distributed evenly over the circumference of the contact shield is applied. This ensures that the liner material to be fastened is pressed evenly against the attachment and fixing point for enabling a secure welding of the liner material to the attachment and fixing point. In a first step, the positioning ring is initially fastened onto the liner material and after a final check the manual welding machine is placed on this positioning ring in order to perform the required welding. A subsequent slipping on the liner material is thus prevented at the outset, and furthermore a secure placement on the liner material in the vicinity of the attachment and fixing points is ensured by a prior check. To this end, the contact shield associated with the manual welding device is inserted in the positioning ring in such a way that the position of the manual welding machine can be clearly determined and fixed by means of the positioning ring and the contact shield. To prevent uneven contact pressure, for example if the manual welding machine is not positioned perpendicularly to the liner material, further provision is made for a pressure-equalizing mounting of the insertable contact shield relative to the manual welding machine. By means of the mounting of the contact shield relative to the manual welding machine according to the invention, a uniform contact pressure is ensured even when the manual welding machine is not placed perpendicularly on the liner material, wherein the contact shield is always seated over the entire surface in the positioning ring and thus rests directly on the surface of the liner material and provides the required contact pressure for the welding. A consistent mean distance between the electromagnetic radiation source and the plane to be welded (focusing plane) is maintained by these measures. In particular the thickness of the liner material is taken into account so that the focusing plane lies directly behind the liner material and a secure welding between the attachment and fixing point and the liner material is thus ensured. When use is made of electromagnetic radiation sources with adjustable focusing planes such as lasers, maintaining the focusing distance is not an issue.

In a special embodiment of the invention, the positioning ring is configured as a vacuum ring and has at least one vacuum connector for a vacuum pump and several, preferably four suction feet, which can be fixed with negative pressure to the material to be processed. With very simple technical aids, the proposed solution makes it possible to place the positioning ring on the liner material in the proper position for the intended welding and to ensure a secure hold for the operation by means of the four suction cups once a vacuum with the necessary negative pressure has been created.

Alternatively, it is possible to use a positioning ring with a circumferential suction ring that can also be fixed to the liner material, wherein a negative pressure can be created via a vacuum connector, which enables the suction ring to be fixed over its entire circumference to the liner material.

For positioning the manual welding machine, the positioning ring has a radial recess in which a guide mechanism with a contact shield can be inserted. To this end, the guide mechanism is connected directly to the manual welding machine, wherein the guide mechanism can consist of several, preferably three, flange discs. A first flange disc serves for attachment to the manual welding machine, e.g., by bolting. The other diametrically opposed flange disc is configured as a guide ring and is inserted in the recess present on the positioning ring. Between both of the outer flange discs is arranged at least one other third flange disc, which is provided solely for joining the outer flange discs by a pivotingly movable bearing. The middle flange disc is connected to each of the two neighboring flange discs by means of two paired bearing elements that form a pivot axis, thus the middle flange disc is configured to pivot relative to the guide ring on the one hand and relative to the manual welding machine on the other. In order to ensure full contact over the entire circumference of the guide ring with even pressing force, the pivot axis of the first and second flange discs and that of the second flange disc and the guide ring are offset from one another by 90°. This makes it possible to configure a mechanism for levelling the manual welding machine relative to the surface of the liner material to be welded, wherein the former is pivotingly mobile along an X-axis and a Y-axis. The flange disc associated with the positioning ring can have a two-piece design and consist of the flange disc and a contact shield that can be joined to one another, wherein the contact shield directly contacts the liner material. The manual welding machine is thus configured to move perpendicularly to the welding plane.

Each bearing element provided can consist of at least two bearing shells with a pivot axis, wherein the pivot axis has a protruding collar and a cotter pin and thus gives rise to an essentially non-detachable unit.

Alternatively, each of the flange discs can be joined to one another by means of at least three hydraulic pistons such that a uniform pressing force is also achievable by means of the hydraulic pistons if, for example, the manual welding machine was not positioned at a right angle to the liner material. Optionally, the hydraulic pistons can enable a pressure compensation by means of a common pressure connection so that an automatic pressure adjustment can occur and the flange discs can thus transfer the contact pressure evenly to the liner material. In lieu of hydraulic pistons, use could be made of at least one circular hose connecting the individual flange discs to one another, wherein the hose is filled with an at least partially incompressible medium so that in this embodiment as well, an even contact pressure over the entire contact surface is achievable.

As an alternative to the previous proposals, it is also possible for the flange disc facing the positioning ring and/or for the contact shield to be joined by elastic compensating elements so that an even contact pressure is also achievable with this solution. An example of an elastic compensation element is a hose filled with an incompressible fluid arranged between the flange disc and the contact shield, which hose is connected to the contact shield on the one hand and to the flange disc on the other so that a contact pressure applied by the manual welding machine is transferred via the hose filled with an incompressible fluid to the contact shield. As another alternative, it is possible to equip the contact shield (on the outer side provided for contact) at least partially with rubber-elastic pads so that an even surface pressure is likewise achievable by means of these elastic pads, wherein it is conceivable to combine several of the proposed solutions with one another. In particular the contact shield provided can have radially outside-lying and/or radially inside-lying compensating elements. Alternatively, the elastic compensating elements can also be arranged between the flange discs. The latter is a relatively rigid embodiment that possesses no swivel capacity, but which is still suitable for applying an even contact pressure on the liner material by means of the elastic compensating elements.

By the joining of the flange discs to the mounting provided, it is thus possible to perform an ideal weld with a manual welding machine even when the latter is not held at a right angle to the liner material. Thanks to the pivotingly movable mounting of the flange discs relative to the lengthwise axis of the manual welding machine, the pressure that needs to be applied to the liner material is equalized, resulting in an even bearing pressure distributed over 360° of the contact shield.

Preference is given to generating the contact pressure on the liner material via the third flange disc configured as a guide ring and via a contact shield, wherein the contact shield is joined to, preferably bolted to, the flange disc. The contact shield itself permits the passage of electromagnetic radiation to the liner material to be processed so that the required plastification of the plastic materials can occur precisely in the intended welding zone with a low radiation dose, and so that in addition the liner material retains its structure in the adjacent area.

In another embodiment of the invention, the contact shield is configured as an aperture mask with annularly arranged segment-like apertures through which the electromagnetic radiation penetrates into the plastic materials and is converted into heat by the absorbing layers. Alternatively, it is possible for the contact shield to be composed at least partially of a material that is transparent to electromagnetic radiation, such as glass or a transparent plastic. By means of the proposed embodiments of the contact shield, the electromagnetic radiation is restricted to a small area that fits the size of the attachment and fixing points so that the neighboring areas of the liner material in particular are not heated and thus remain structurally intact. In particular the elasticity of the materials is thus only affected to a limited extent; moreover an undesired warping of the liner material in the vicinity of the attachment and fixing points is avoided. In any case the structural configuration of the positioning device, either as a rigid or as a pivotingly movable solution, ensures that an even contact pressure is exerted on the liner material. In particular this configuration also ensures that the focusing plane between the electromagnetic radiation source and the welding plane is maintained as necessary for the electromagnetic radiation source.

A considerable advantage in the use of the inserted manual welding machine and the positioning ring resides in the fact that the plastic and welding materials are only plastified in a limited area of the cross-section, wherein said area essentially extends over the area of the attachment and fixing points. The energy input needed for heating the plastic and welding materials used is considerably less than with standard welding methods wherein, owing to the low degree of plastification, the plastic materials to be processed are not permanently warped and damage to the liner materials, e.g., inliners, is thus avoidable. Furthermore, the manual welding machine can be used in contact with the liner materials without causing damage to the latter. The required contact pressure is readily transferred via the liner materials to the deeper-lying plastic materials, particularly to the attachment and fixing points, which serve as counterholders. Furthermore, due to the only limited plastification of said liner materials, the contact pressure is only needed for a short while because both the welding and liner materials are fast cooling and are bonded relatively quickly.

Another considerable advantage of the manual welding machine with the positioning device resides in the fact that the low energy input required does not cause the plastic materials to warp and particularly in that, owing to the cross-sectional reductions, the formation of weak spots is avoidable. With the manual welding machine, the energy input can be kept as low as possible, as by using an electromagnetic radiation head a precise dose is possible and the energy to be applied is introduced directly into an absorbing coating. Additionally, the contact pressure can be kept as low as possible since a manually-applied pressing force suffices.

The plastic materials used can have thermostable additives in the form of laser- or infrared-sensitive particles that are composed of organic and inorganic materials with a minimum temperature stability, wherein the temperature corresponds to the processing temperatures of the plastic materials used and wherein the additives, depending on the heating method, can consist of, e.g., colorants in the form of dyes or pigments such as soot particles or mica with a tin-antimony coating in order to allow the electromagnetic radiation to be absorbed.

The absorbing thermostable additives in the coating are also mainly composed of infrared-sensitive or laser-sensitive particles, preferably of organic or inorganic materials with a minimum stability to temperatures corresponding to the processing temperatures of the plastic materials used and, depending on the heating method, consist of, e.g., pigments such as soot particles or mica with a zinc-antimony coating. The same is true for the absorbing plastic materials that are cemented onto the wall surface. As in the absorbing coating, suitable thermostable particles are used in these plastic materials as well. The plastic materials and coatings used herein absorb electromagnetic radiation in the wavelength range of 150 to 2,500 nanometers, preferably 500 to 1,500 nanometers, and particularly preferably 800 to 1000 nanometers.

Possible electromagnetic radiation sources include a solid state laser, a gas laser, a semiconductor laser, or an infrared source such as a xenon short arc lamp, or use can be made of a $CO_2$ laser. Alternatively, a microwave radiation or an induction welding process can be used. All of the aforementioned devices generate electromagnetic radiation that can be used to line the joining area of the container walls, wherein the plastic materials are only plastified enough to achieve a secure welding.

In order to meet the demands of the industry, in other embodiments the electromagnetic radiation of the radiation head can be supplied within a closed wall or via an optical conductor to the joining area formed by the welding and plastic materials. This provision is necessary when, for example, a laser is being used as an electromagnetic radiation source.

In induction welding, the heat needed for the welding is supplied to the joining area by means of an alternating magnetic field. The main phases of this procedure are heating, consolidation under pressure, and cooling, wherein the main influencing parameters are defined by the consolidation pressure and the temperatures of the joining area. The welding of plastic materials requires a welding consumable that converts the energy of an electromagnetic field into heat. This welding consumable, henceforth designated as filler material, remains in the weld zone permanently.

Possible filler materials include ferromagnetic materials, wherein use can be made of nanoparticles or mill material in particular. Nanoparticles are defined as composites of a few to a few thousand atoms or molecules. The name refers directly to the size of the particles, which is typically between 1 and 100 nanometers. Nanoparticles can be produced by natural means as well as by synthetic processes, wherein said particles are intentionally given new properties or functionalities such as electrical conductivity, chemical reactivity, etc. Synthetic nanoparticles can be classified according to their chemical and physical properties. In research and industry the following groups are common:

Carbon-containing nanoparticles, metal oxides, titanium dioxide, aluminum oxide, iron oxide, zinc oxide, and zeoliths and other silicon-based mesoporous materials such as MCM-41 or SBA-15, semiconductors, metals, metal sulfides, and polymers such as dendrimers and block copolymers, wherein the carbon-containing nanoparticles can be present in various forms such as fullerenes, nanotubes, or carbon black (soot particles).

The nanoparticles or the mill material can be thermally excited by a magnetic field or an electric field, wherein a magnetic field induces movement of the nanoparticles in a material, and electric fields excite the electrons. Both measures cause the nanoparticles or the mill material to heat up due to the resulting friction.

In normal materials with many Weiss domains, a magnetic reversal of a magnetized ferromagnetic material is brought about by the displacement of the potential wells between the individual domains, i.e., the magnetic moments can approach the boundaries of one Weiss domain and then belong to the neighboring domain. If the particle size drops below the size of the Weiss domains, the respective particle then consists of only one Weiss domain. A displacement of a potential well is not possible in such "single domain particles" because there is no well between two domains and hence no probability for an antiparallel aligned atomic magnetic moment. This means that the spins in single domain particles can only change collectively, which translates to a very high coercivity field strength.

Ferromagnetic crystallites can be thought of as composed of domains. The atomic magnetic moments are aligned parallel within these (Weiss) domains. The volume of the Weiss domains is typically $10^{-4}$ to $10^{-6}$ mm$^3$.

If a ferromagnetic material is introduced in an outer magnetic field, the magnetic moments of the Weiss domains align themselves parallel to the outer magnetic field. This results in magnetization. The magnetization increases as the field strength of the outer magnetic field increases until reaching a saturation field strength, in which a complete alignment of the electron spins is achieved. If the field strength of the outer magnetic field is subsequently allowed to return to zero, the magnetization then follows a hysteresis loop rather than the original curve. With a field strength=0, a certain level of remanent magnetization is retained and the ferromagnetic material is thus converted into a permanent magnet. The magnetization of the sample will not return to zero until a coercivity field strength aligned antiparallel to the magnetization of the material is attained.

If the field strength of the outer magnetic field continues to increase to a certain value, negative saturation magnetization is reached. If the field strength is then decreased, its direction rotates and it gradually increases. These properties are intrinsic to ferromagnetic materials, and by changing the magnetic field, for example by means of an induction coil, it is possible to exploit this possibility for heating ferromagnetic materials. The ferromagnetic materials can consist of, for example, a metallic mill material or use can be made of nanoparticles, which have other useful properties. In principle it must be assumed that magnetic nanoparticles have a different isotropy, and this has a considerable effect on the coercivity thereof. The crystals and the particle formation isotropy are key factors in magnetic nanoparticles. However, anisotropies brought about by exchange between the nucleus and the shell must also be taken into account in certain cases. Magnetocrystalline anisotropy arises from spin-orbit coupling and the energetically preferred alignment of the magnetization along a preferred axis. The coercivity field strength of a nanophase material is proportional to the anisotropy, hence these materials can be used as filler materials in induction welding. Owing to the random orientation of the particles, a polycrystalline sample of filler materials does not possess net anisotropy. However, non-spherical particles can exhibit shape anisotropy, since it is easier to magnetize a cylindrical particle along the edge than it is along the short edge. The deviation from the spherical shape need not be excessive; even a 1.1 to 1.5% deviation from the spherical shape results in a fourfold increase of the coercivity field strength.

Of particular interest in this context are the properties of nanoparticles, which can be magnetic, ferrimagnetic, ferromagnetic, antiferromagnetic, or superparamagnetic. Superparamagnetism in nanoparticles is explained by the further decrease in particle volume, resulting in the atomic magnetic moments being influenced to an increasingly greater extent by the thermal movement of the particles and no longer able to align in parallel. The result is superparamagnetism. Superparamagnetic particles behave exactly like paramagnetic particles, except that they have a considerably larger magnetic moment. Below a so-called block temperature, these materials once again behave as ferromagnetic materials. Superparamagnetic materials do not show hysteresis loops, thus they are readily distinguishable from ferromagnetic particles by experimental means. The nature of the nanoparticles, however, depends on the aforementioned block temperature and on the shape of the particles. For example, rod-shaped magnetic nanoparticles with dimensions of 2×10 nm have a block temperature of only 110 K, whereas spherical particles with a diameter of 2 nm have a block temperature of 12 K.

The synthesis of magnetic nanoparticles entails numerous problems. In order to maintain a uniform behavior of the nanoparticles, it is essential to control certain parameters as precisely as possible. For one thing it is desirable to maintain a particle size distribution as narrow as possible because size is a key factor in defining the magnetic behavior of nanoparticles. With standard synthesis methods, it is only possible to restrict the particle size distribution to a deviation of ca. 10%. As a general rule, however, fractions with deviations in particle size distribution of less than 5% are required. A standard method is fractionated flocculation: adding a pure solvent to a sample of nanoparticles of different sizes will cause the largest particles to conglomerate, as the latter have the strongest van der Waals attractive forces. The conglomerate can then be separated by centrifuging and the procedure repeated.

The crystallinity of the products is another parameter. A high crystallinity is desirable for achieving the highest possible magnetization. However, the influence of the crystal structure is also an important parameter, as it can be used to control the anisotropy of the magnetic nanoparticles. In general it is possible to increase the crystallinity and influence the crystal structure by means of a controlled aging process, which can be brought about, for example, by heating to a specific temperature over a certain period of time. There are various known methods for manufacturing the individual types of nanoparticles, which cannot be discussed in detail here.

The use of nanoparticles with their magnetic, ferrimagnetic, ferromagnetic, antiferromagnetic, or supraparamagnetic properties as filler material is especially well-suited for bonding a wide variety of plastic materials, wherein the filler material contains nanoscale, magnetic, or oxidic particles which can be composed of aggregated primary particles or wherein the filler material can be composed of ferrites, oxides, or mixed metal oxides. The particle size is typically between 1 and 500 nm, in particular between 2 and 100 nm.

An excitation of the nanoparticles can be achieved with, e.g., microwave radiation with a frequency of 1.5 to 10 GHz, preferably in the range of 2 to 3 GHz; however, use can be made of other types of electromagnetic radiation as well, with which the properties of the nanoparticles as filler materials can also be exploited and bring about a heating of the materials, preferably plastic materials, to be welded.

As an alternative to nanoparticles, various metals in the form of milling material can be added to the plastic materials in enriched form so that, with the help of an electromagnetic field and given the movements induced within the enriched material by the field change, a heating and hence a welding of various plastic materials can be brought about. A type of electromagnetic radiation that typically lies within the resonance range of the nanoparticles or milling material used should be employed in order to achieve a high energy input, wherein the resonance frequency can be altered by systematic addition of nanoparticles.

The special advantage of nanoparticles or milling material resides in the fact that the use of transparent plastics can be dispensed with and suitably enriched economical plastic material can be used instead. Nanoparticle enrichments of typically 1 to 5%, preferably 2 to 3%, suffice for welding with an induction welder or microwave irradiation. The use of milling material, particularly finely milled metal (metal powder) is also suitable for compounds because of the dipole effect. Furthermore, microwave irradiation or induction welding ensure greater work safety due to the energy sources used.

The invention is explained in more detail in the following, with reference to the figures.

Shown are:

FIG. 1 a cutaway lateral view of a first illustrative embodiment of a manual welding machine with a hose ring and a contact shield as well as a positioning device removed therefrom consisting of a positioning ring and a support ring, FIG. 2 a cutaway lateral view of a second illustrative embodiment of a manual welding machine with flange discs and a positioning device removed therefrom consisting of a positioning ring and a support ring, FIG. 3 a perspective view of the flange discs with a contact shield capable of being bolted onto the manual welding machine, FIG. 4 a view from above of the flange discs according to FIG. 3, FIG. 5 a first lateral view of the arrangement of flange discs according to FIG. 3, FIG. 6 another lateral view of the flange discs according to FIG. 3, FIG. 7 a lateral view of the flange discs with a contact shield and a hose capable of being bolted onto the manual welding machine, FIG. 8 a perspective view of a positioning device with a positioning ring with suction feet, FIG. 9 a view from above and a lateral view of the positioning ring according to FIG. 8, FIG. 10 a view from above and a lateral view of the centering disc of the positioning ring, and FIG. 11 a cutaway lateral view of a positioning device with a suction ring.

Figure 11:
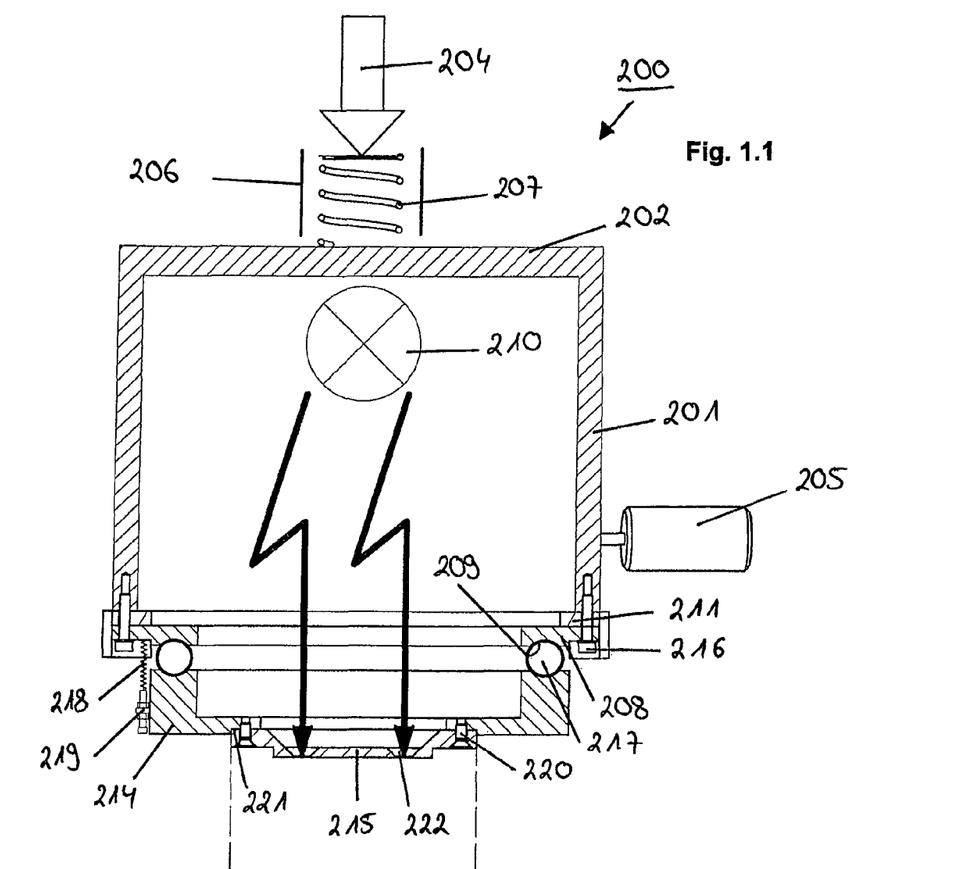
Figure 12:
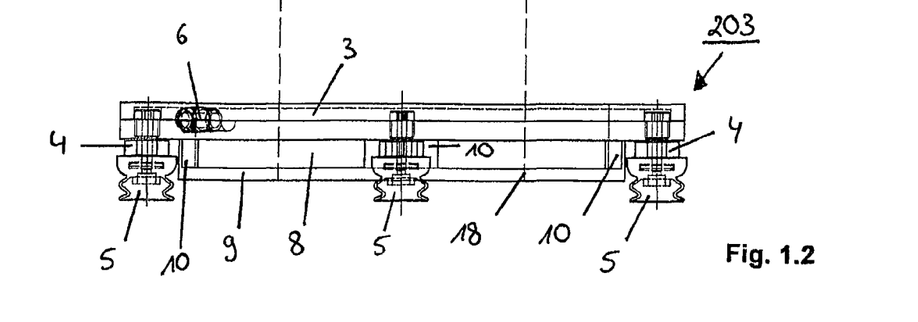

FIGS. 1.1 and 1.2 show a cutaway lateral view of a manual welding machine 200, which is provided for use with a positioning device 203. The manual welding machine 200 of the invention is composed of a housing 201, which is shown as a one piece variant. It is also possible, however, to manufacture the housing out of several individual components. Above the housing 201 an arrow 204 illustrates the possibility of introducing a force, which is exerted directly on a spring 207 guided in a spring guide 206. On its other end the spring 207 rests on the top housing cover 202 in such a way that the force is ultimately transferred via the spring and the housing 201 to a contact shield 215. A handle 205 provides additional support for holding the housing 201. The introduced force serves to exert a pressure on the materials to be welded long enough to allow the joining zone to harden subsequently to plastification and cooling. By means of the spring 207, pressure fluctuations can be absorbed in order to ensure an even pressing force by the contact shield 215.

Inside the housing is arranged a radiation source 210 that is symbolized by the two jagged arrows, wherein the outbound electromagnetic radiation is introduced directly into the materials to be welded, preferably plastic materials, via an aperture mask present on the contact shield 215. In the illustrative embodiment shown, the housing 201 is open at the bottom and accordingly sealed by a flange disc 208. The flange disc 208 is joined to the housing by means of a spacer ring 211 and circumferentially distributed threaded bolts 216. The flange disc 208 has a circumferential trough-shaped depression 209, which is provided for holding a hose 217 filled with an incompressible fluid. The hose 217 is disposed between the flange disc 208 and a positioning ring 214, wherein an attachment is achieved by means of circumferentially distributed springs 218 with screw adjustment 219. The springs 218 are connected on one end to the screw adjustment 219 and rest on the other end in a depression of the flange disc 208 so that there is an almost elastic connection between the flange disc 208 and the positioning ring 214. The positioning ring 214 additionally serves as a support for a contact shield 215, which is bolted to the positioning ring 214 by means of screws 220. The contact shield 215 rests with a first larger radial section in a depression 221 of the positioning ring 214 and is secured by the screws 220. The contact shield 215 has, e.g., segment-like apertures 222 through which the electromagnetic radiation directly reaches the plastic materials to be welded.

Underneath the manual welding machine is shown a positioning device 203, which consists of a positioning ring 3 with several circumferentially distributed feet 4 equipped with suction feet 5. The suction feet 5 come into direct contact with the plastic materials to be welded and enable the positioning device 203 to be fixed to the plastic materials. To this end the air is suctioned from the suction feet 5 by means of a vacuum machine (not shown) via a vacuum connector so that the positioning device 203 can be fixed to the plastic. Underneath the positioning ring 3 is located a support ring 9, which is joined to, preferably integrated with, the positioning ring 3 by bars 10. Several circumferentially distributed recesses 8 are formed between the bars 10. The support ring 9 has a borehole 18, the size of which is dimensioned so that the contact shield 215 can be inserted therein. Hence when the manual welding machine 200 is placed on the fixed positioning device 203, the contact shield 215 comes to rest directly on the plastic materials through the borehole 18.

The special advantage of this first variant of embodiment resides in the fact that, by means of the positioning device 203, an initial fixing on the position of the plastic materials to be welded is possible, and then the manual welding machine 200 can be placed on the positioning device 203 with the aid of the existing guide, wherein the hose 217 filled with incompressible fluid further ensures that an even contact pressure is applied on the plastic material via the contact shield 215. Should the manual welding machine 200 not be positioned perpendicularly to the plastic material to be welded, a pressure compensation takes place and thus an even contact pressure is always ensured.

Figures 21, 22:
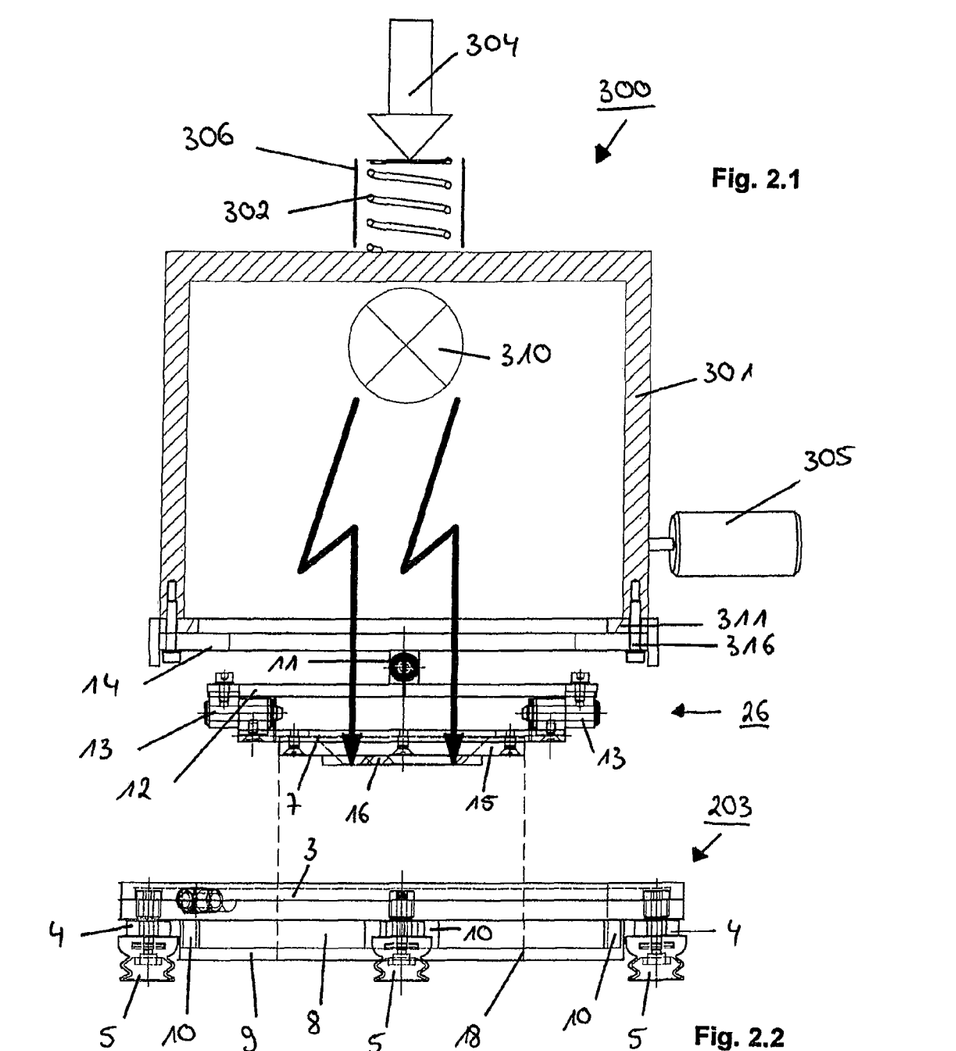

FIGS. 2.1 and 2.2 show a second variant of embodiment of a manual welding machine 300 with a housing 301 and a spring 302 mounted above the housing in a spring guide 306. On this spring 302 as well a force in the direction of the arrow 304 is exerted, in order to exert a contact pressure on the materials to be welded via the housing 301 and the existing contact shield 16. In the interior of the housing 301 is arranged a radiation source 310 for electromagnetic radiation, which is symbolized by the jagged arrows and can act directly on the plastic materials through the contact shield 16 and the segment-like apertures present thereon. In this embodiment as well the housing 301 has a handle 305, wherein the housing 301 is open at the bottom. The opening of the housing 301 is first sealed by a spacer disc 311 and then by a flange disc 14, wherein a bolt connection is established by means of threaded bolts 316. The flange disc 14 is part of a guide mechanism 26, which can also be inserted in the positioning device 203 disclosed in FIG. 1. The guide mechanism 26 consists of the flange disc 14 bolted to the housing 301, another flange disc 12, and then a flange disc 7. Between the first and second flange discs 14, 12 is arranged a paired bearing element 11, whereas between the second and the third flange discs 7, 12 is arranged a second, likewise paired bearing element 13. Both of the bearing elements 11, 13 are in each case arranged staggered by 90° to one another so that the guide mechanism 26 is pivotingly movable. The housing 301 can thus be positioned, if needed, at an angle <90° relative to the plane of the plastic material to be processed. The guide mechanism 26 enables a pivoting mobility of the housing 301 relative to the positioning device 203.

The positioning device 203 is identical to the embodiment disclosed in FIG. 1, wherein the contact shield 16 can be inserted in the borehole 18. Once the guide mechanism 26 has been placed in the positioning device 203, a slipping of the manual welding device 300 on the materials to be welded can be prevented, wherein in addition the pivoting mobility provides considerable flexibility in terms of an operating angle. In spite of a manual welding device 300 possibly not positioned at a right angle, an even pressing force can thus be transferred via the guide mechanism 26 to the contact shield 16 and hence to the plastic material.

Figure 3:
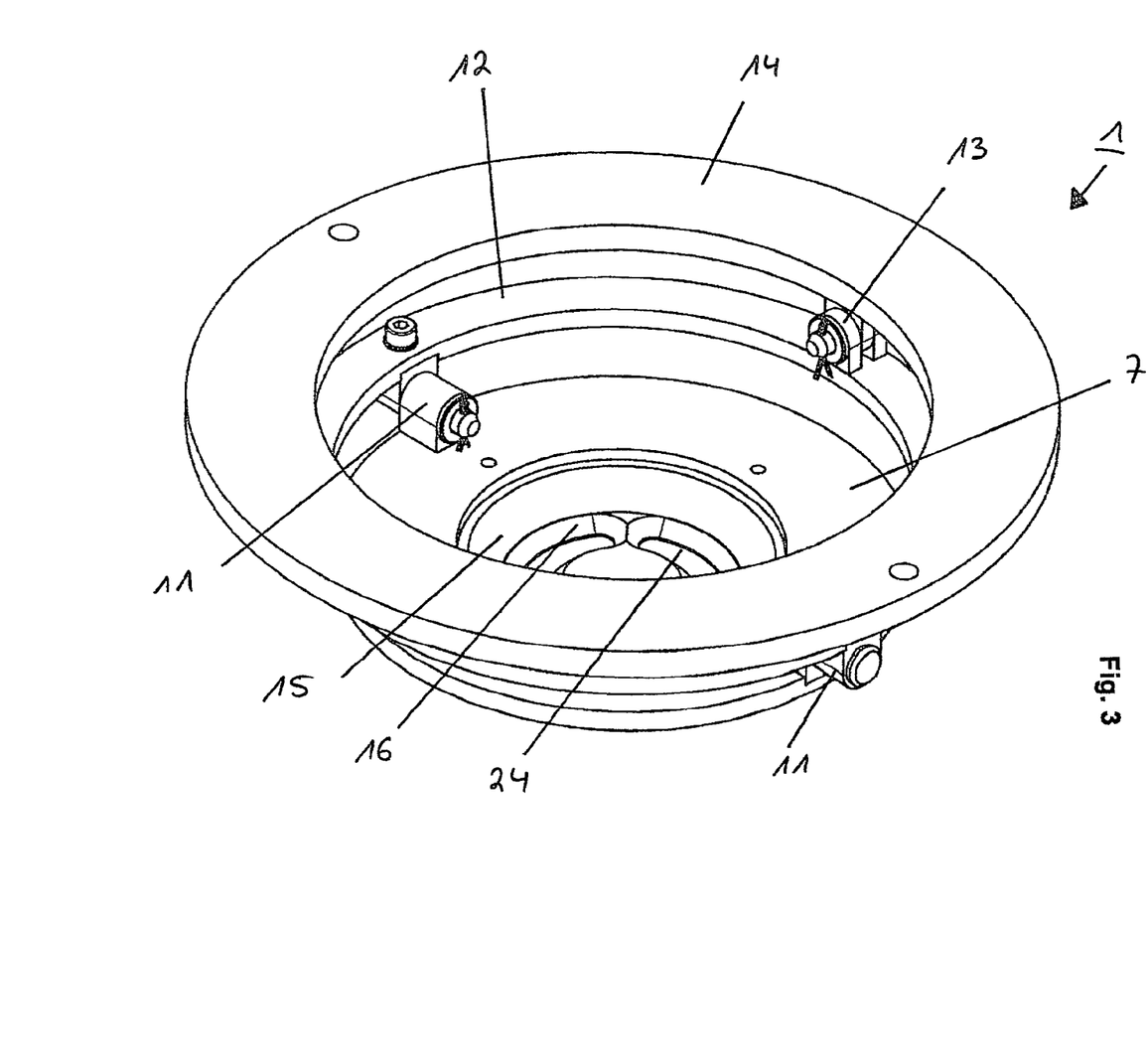

FIG. 3 shows a perspective view of a first part of the positioning device 203 consisting of a first flange disc 14 for attachment to the manual welding machine, a second flange disc 12, as well as a third flange disc 7 configured as a guide ring. Among other things, the flange disc 7 serves for attaching the contact shield 16, which is bolted via an attachment ring 15 to the flange disc 7. The individual flange discs 7, 12, 14 are joined to one another by means of bearing elements 11, 13 in such a way that two paired bearing elements 11, 13 in each case form a common axis and said axis-forming bearing elements 11, 13 are arranged offset from one another by 90° between the first and second flange discs 12, 14 or between the second and third flange discs 7, 14.

The bearing elements 11, 13 themselves consist of a bearing bushing 20 with a bearing pin 21, which is secured in the bearing bushing 20 by means of a cotter pin 22 and an enlarged collar 23. From this view it can be further discerned that the contact shield 16 has segment-like apertures 24, through which the electromagnetic radiation reaches the absorbing layers of the liner material and/or of the attachment and fixing points. Alternatively, use can be made of an electromagnetic radiation-permeable glass pane as a contact shield 16.

Figure 4:
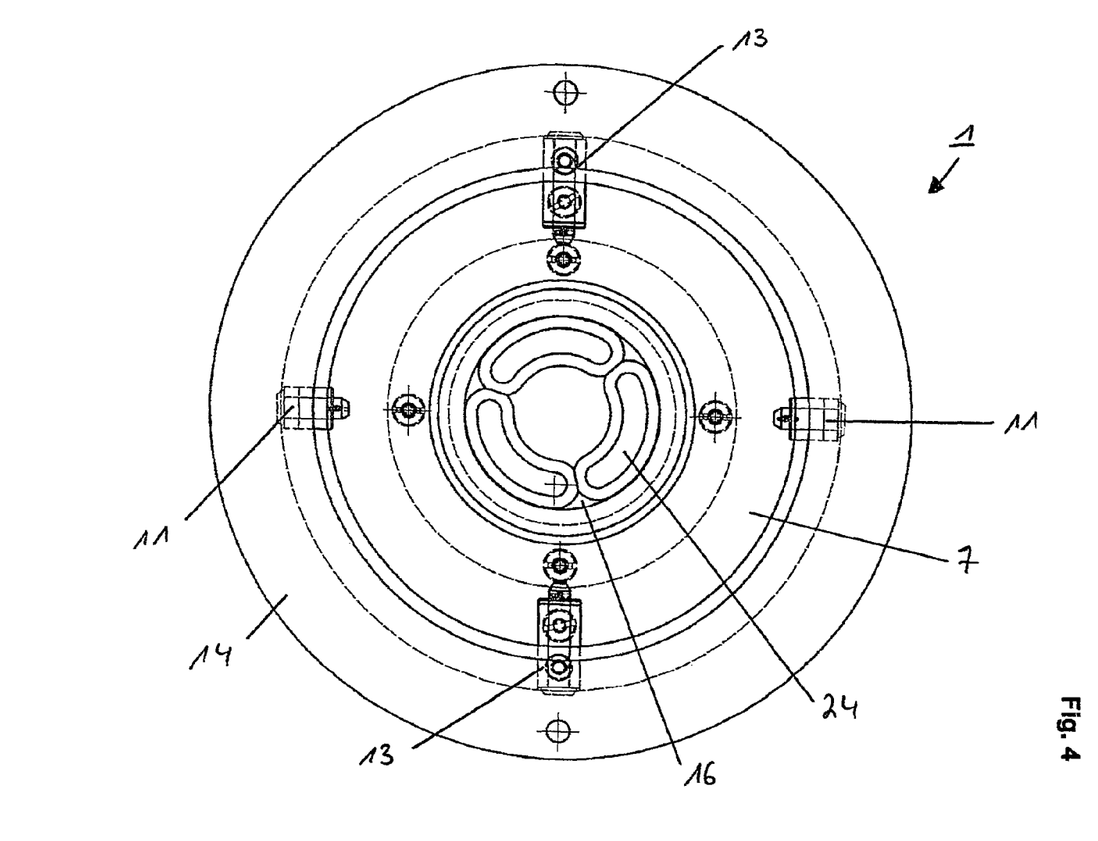

FIG. 4 shows the positioning device 203 disclosed in FIG. 3 in a view from above, with the flange discs 7, 12, 14 and the bearing elements 11, 13. From this view it can be discerned that the contact shield 16 is equipped with segment-like apertures 24 through which the electromagnetic radiation reaches the liner material.

Figure 5:
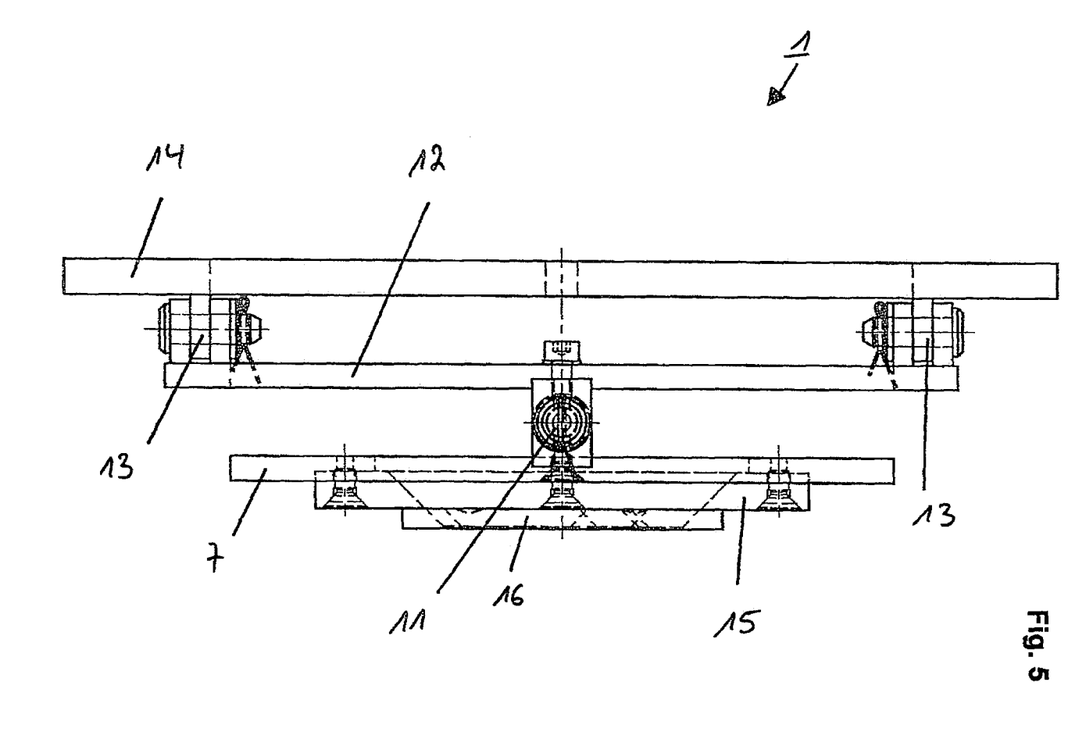

FIG. 5 shows the positioning device 203 according to FIG. 3 in a first lateral view, wherein from this view the stage-wise construction of the positioning mechanism 203 can be discerned, with a top flange disc 14 provided for attachment to the manual welding machine as well as a middle flange disc 12 and a bottom flange disc 7. In this view it is especially evident that the top and middle flange discs 12, 14 are connected to one another by the bearing elements 13, whereas the middle and bottom flange discs 12, 7 are connected to one another by the bearing elements 11. The 90° offset position of the bearing elements 11, 13 allows a pivoting of the manual welding machine in all conceivable positioning directions so that an even contact pressure is achievable when the manual welding machine is positioned obliquely. The contact shield 16 lies with its contact surface 25 directly on the liner material. In order for the pressure to be applied by the manual welding machine to be transferred solely through the contact shield 16, the positioning ring 7 is, in a manner readily discernible in FIG. 1, guided in the pocket-like recess 8, which allows the contact shield 16 to press directly on the liner material regardless of the height of the positioning ring 3. The positioning ring 3 merely fixes the exact position over the attachment and fixing point, wherein the exact position can be visually checked and corrected at all times. After positioning the manual welding machine 2, the electromagnetic radiation source must be turned on for a brief time until plastification occurs, and then the contact pressure is applied until the partially plastified liner materials and/or attachment and fixing points have sufficiently hardened so as to achieve a permanent bond.

Figure 6:
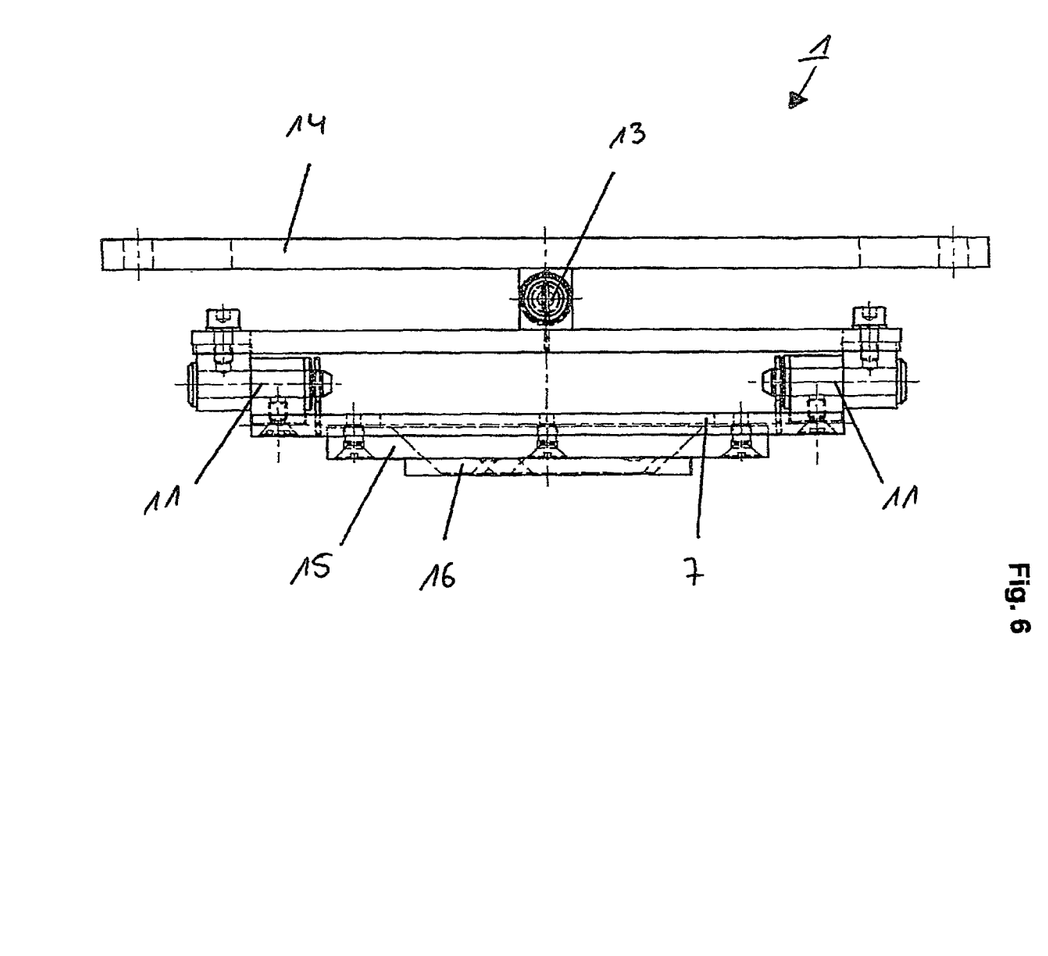

FIG. 6 shows another lateral view of the positioning device 203 with the construction of the previous figures, in particular FIG. 5, wherein the joining of the middle and bottom flange discs 12, 7 by the bearing elements 13 can be discerned in this illustration, which is rotated 90° relative to FIG. 5.

Figure 7:
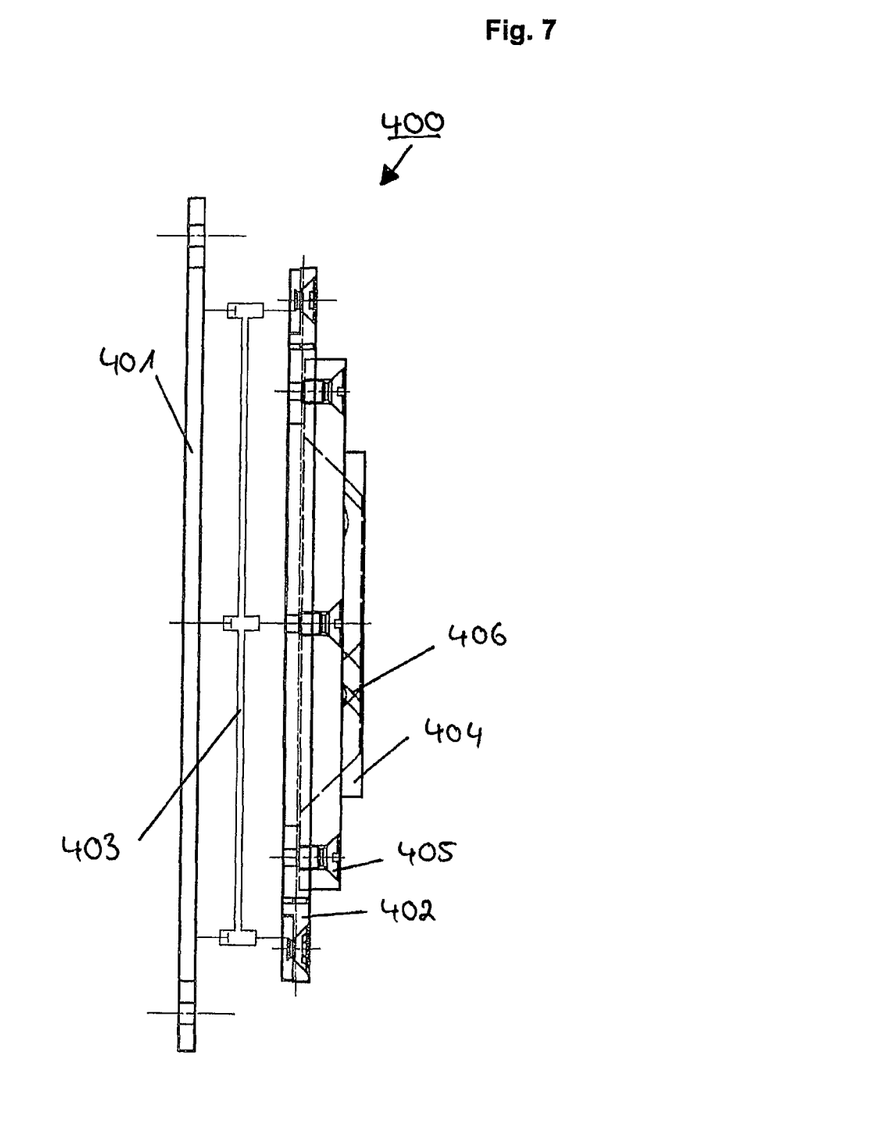

FIG. 7 shows the positioning device 203 in a perspective view, specifically a positioning ring 3 which is attached directly on the plastic materials to be welded by means of feet 4 equipped with suction feet 5 at the head end, wherein a negative pressure can be created in the suction feet 5 via a vacuum connector 6. To this end, the individual feet 4 are connected to the vacuum connector 6 by means of a circular pipeline (not shown). The positioning device 203 consists of a positioning ring 3 and a support ring 9 with a borehole 18, which is further provided to receive the contact shield. A joining to the support ring 9 is achieved by means of bars 10, which are circumferentially distributed and integrally formed on the positioning ring 3. The bars thus formed give rise to a recess 8 between two neighboring bars 10 in each case, through which the placement of the manual welding machine can be checked. The length of the bars 10 was chosen so that the manual welding machine with the contact shield 16 can be inserted precisely in the positioning ring 3 and so that the contact shield 16 comes to rest directly on the plastic material once the manual welding machine is in place.

The welding itself is performed using electromagnetic radiation, wherein the manual welding machine 2 can be constructed in many different ways, depending on the type of electromagnetic radiation. With the positioning device 203, it is possible to use all manual welding machines 2 regardless of the type of electromagnetic radiation.

Figure 8:
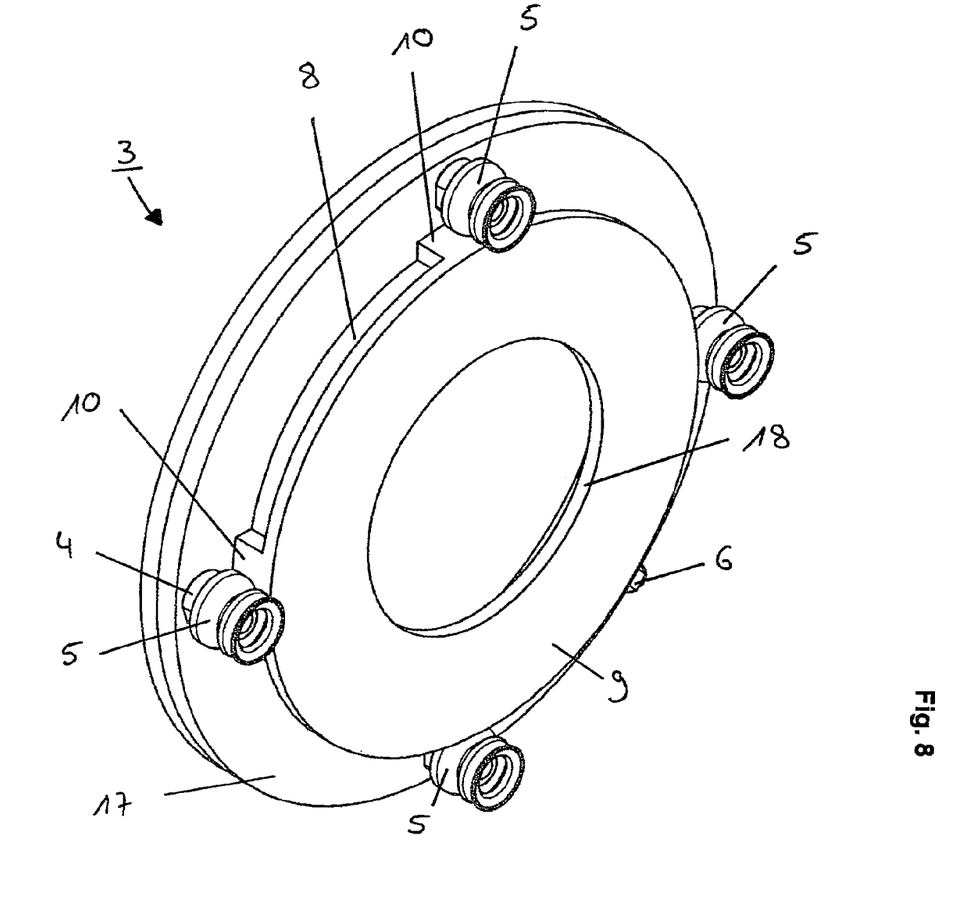

FIG. 8 shows a cutaway lateral view of another guide mechanism 400, which can be used, for example, with the manual welding machine 300. The guide mechanism 400 has a first flange disc 401, which is provided for bolting onto the manual welding machine (not shown). Between the flange disc 401 and another flange disc 402 is arranged an elastic body 403, which, as in the variant of embodiment of FIG. 2, likewise allows a pivoting mobility of the attached manual welding machine to a slight extent, simultaneously ensuring that the contact pressure to be applied is evenly distributed over the entire surface of the frontal contact shield 404. The contact shield 404 is bolted onto the flange disc 402 with screws 405 and its outer dimension is configured to correspond to the borehole 18 of the positioning device 203. The presence of the segment-like apertures 406 ensures that the electromagnetic radiation emerging from the manual welding machine is able to pass through the contact shield 404 and act on the plastic materials. Alternatively, use can be made of an electromagnetic radiation-permeable material as a contact shield 404. Examples of such materials include a transparent glass or plastic material. This supplemental embodiment is provided as a substitute for the guide mechanism 26 disclosed in FIG. 3.

Figure 91:
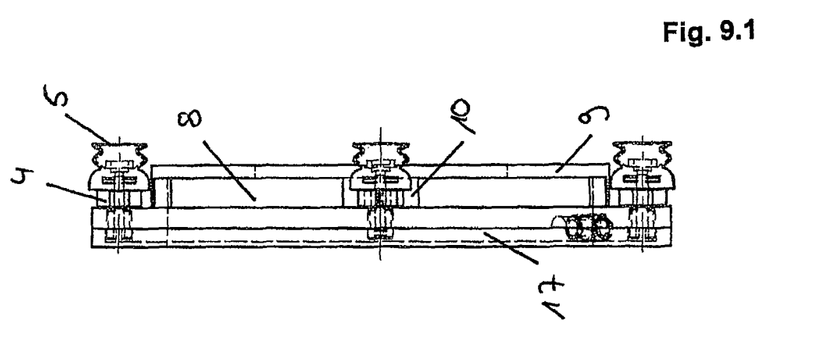
Figure 92:
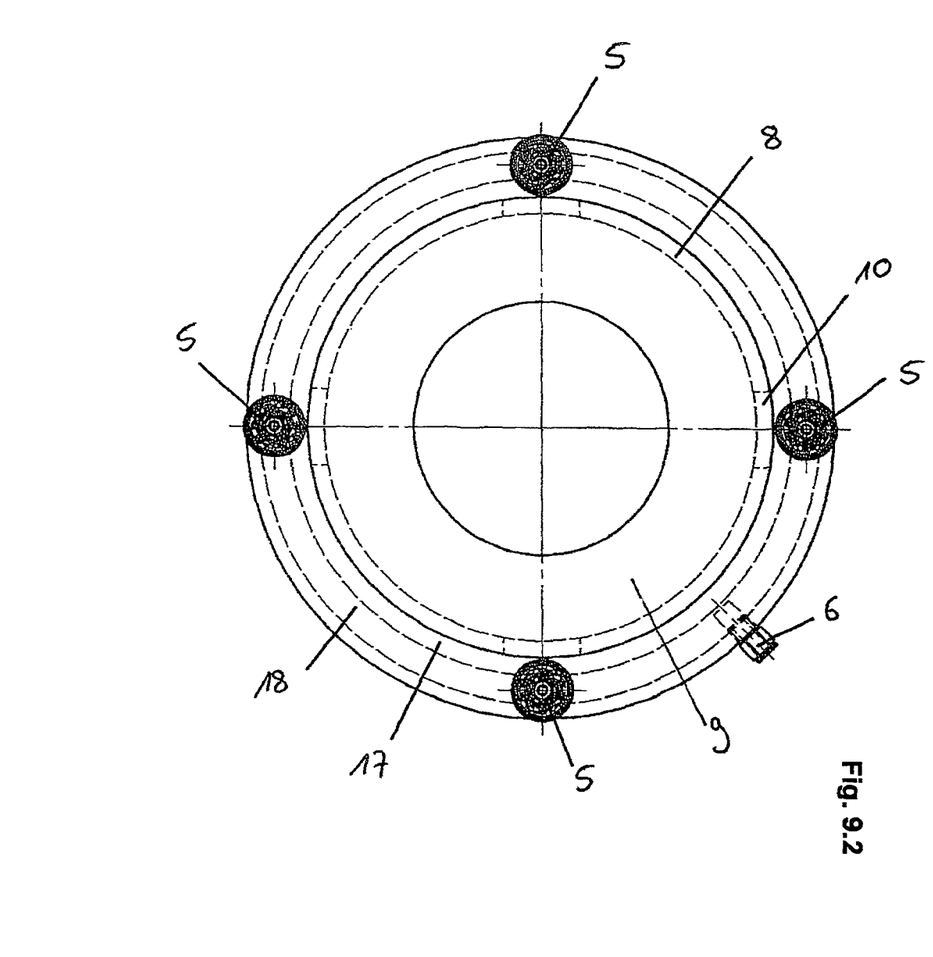

FIGS. 9.1 and 9.2 show a view from above and a lateral view of the positioning device 203 with the positioning ring 3, wherein it can be discerned that four suction feet 5 are circumferentially distributed and connected to the vacuum connector 6 by means of a circular channel 19. The circular channel 19 is formed in the positioning ring 3, which is used for accommodating the individual suction feet 5 and furthermore serves as a means for attaching the support ring 9 via the bars 10.

Figure 101:
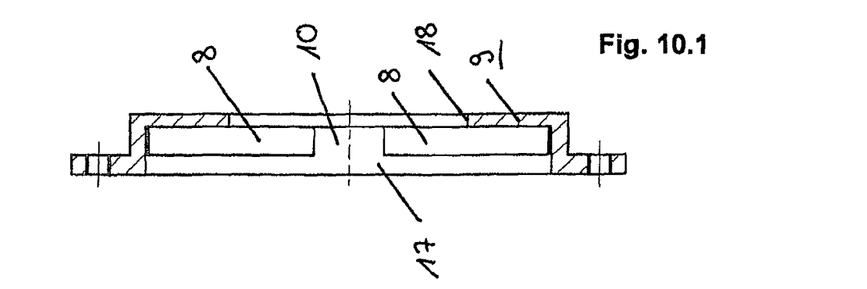
Figure 102:
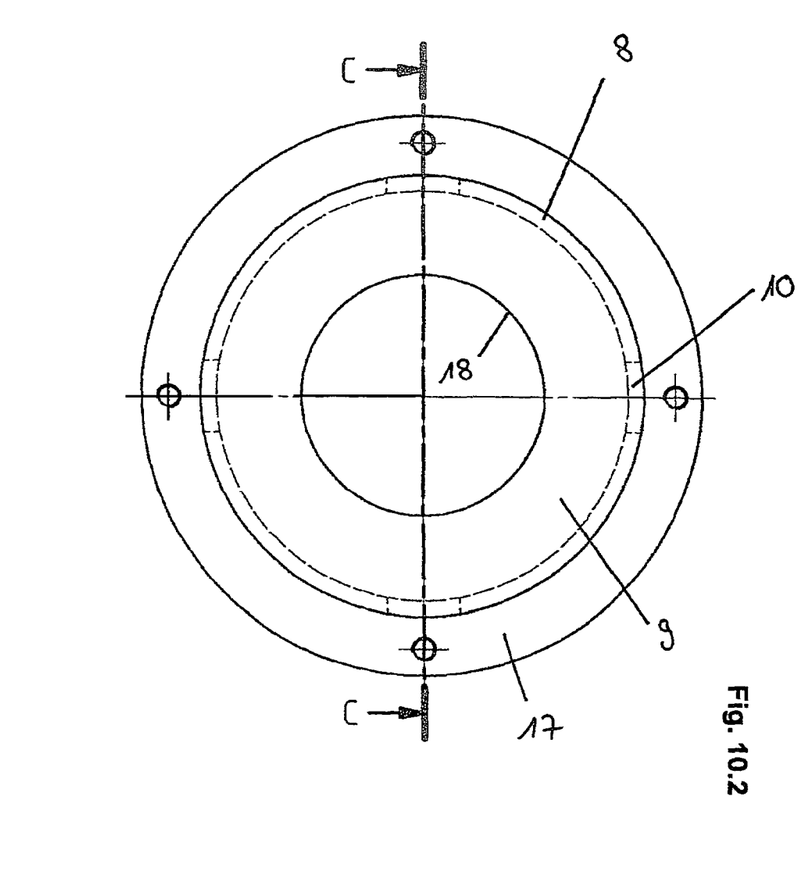

FIGS. 10.1 and 10.2 also show the stage-wise configuration of the positioning ring 3 in a view from above and in a cutaway lateral view in a single illustration, wherein the pot-shaped configuration can be discerned. The positioning ring 3 is joined to the support ring 9 by means of the bars 10, thus giving rise to the pot-shaped configuration.

Figure 111:
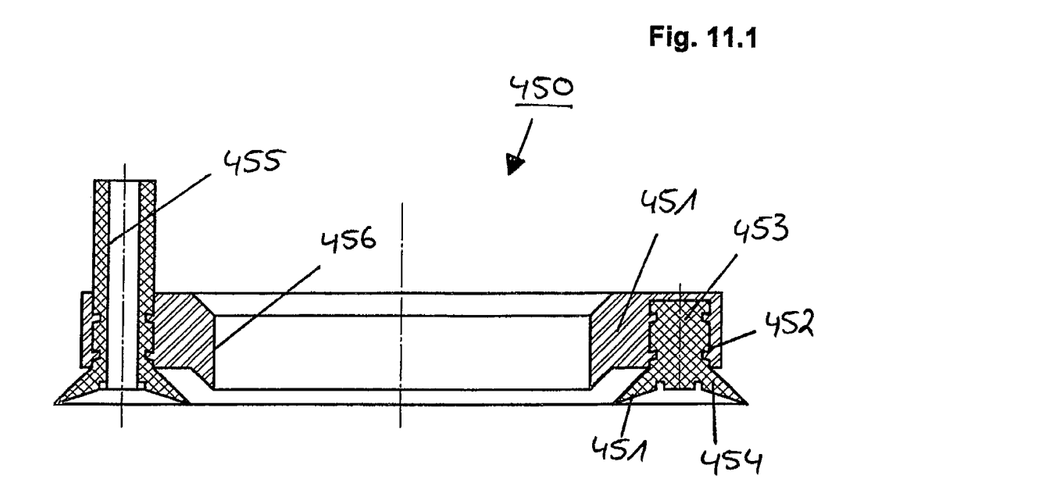
Figure 112:
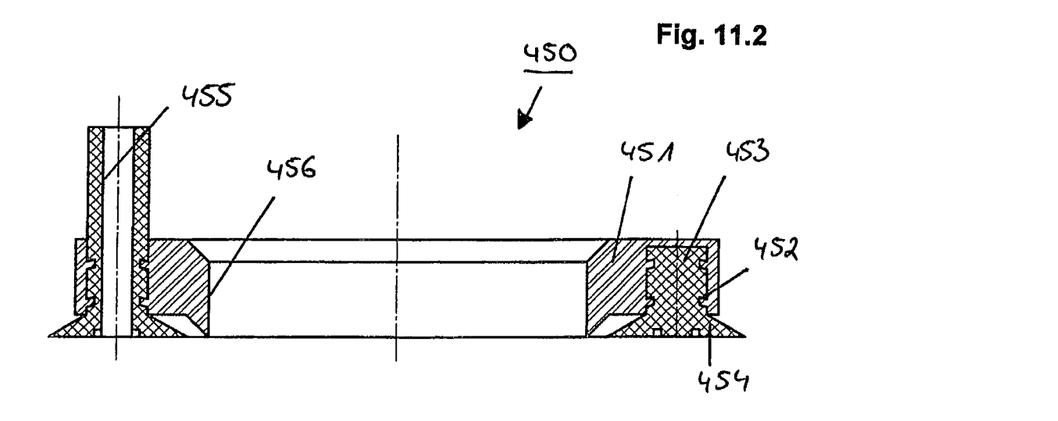

FIGS. 11.1 and 11.2 show two cutaway lateral views of a positioning device 450 provided as a substitute. This positioning device 450 is composed of a washer 451 with a circumferential groove 452, in which a rubber ring 453 with diverging V-shaped sealing lips 454 can be placed on the (not shown) plastic material. The air under the rubber ring 453 can be suctioned out via a vacuum connector 455 so that the sealing lips 454 can cling firmly to the plastic material. The top partial figure shows the positioning ring 450 before suction is applied and the bottom partial figure shows it with splayed suction lips 454 after suction has been applied. Hence it is also possible to fix the described manual welding machines 200 and 300 by using this positioning device 450. In order to insert the manual welding machines 200 and 300 in the positioning device 450 with the help of a guide mechanism 26 as in the previously described examples, the positioning device has a borehole 456 dimensioned correspondingly to the guide elements of the guide mechanism 26. It is thus possible to center and position the respective contact shield of the guide mechanism on the plastic materials through the borehole 456, thus giving rise to the already described advantages, namely that a slipping of the manual welding machine 200, 300 can be prevented after the positioning device 450 is fixed.

LIST OF PARTS AND REFERENCE NUMBERS

3 Positioning ring
4 Foot
5 Suction foot
6 Vacuum connector
7 Flange disc
8 Recess
9 Support ring
10 Bar
11 Bearing element
12 Flange disc
13 Bearing element
14 Flange disc
15 Attachment ring
16 Contact shield
17 Flange ring
18 Borehole
19 Circular channel
20 Bearing bushing
21 Bearing pin
22 Cotter pin
23 Collar
24 Aperture
25 Contact surface
26 Guide mechanism
200 Manual welding machine
201 Housing
202 Housing cover
203 Positioning device
204 Arrow
205 Handle
206 Spring guide
207 Spring
208 Flange disc
209 Depression 210 Radiation source
211 Spacer ring
212 End plate
213 End face
214 Positioning ring
215 Contact shield
216 Screw
217 Hose
218 Spring
219 Screw adjustment
220 Screw
221 Depression
222 Aperture
300 Manual welding machine
301 Housing
302 Spring
304 Arrow
305 Handle
306 Spring guide
310 Radiation source
311 Spacer disc
316 Threaded bolt
400 Guide mechanism
401 Flange disc
402 Flange disc
403 Elastic body
404 Contact shield
405 Screw
406 Aperture
450 Positioning device
451 Washer
452 Groove
453 Rubber ring
454 Sealing lips
455 Vacuum connector
456 Borehole

The invention claimed is:

1. A positioning device for a manual welding machine, wherein the welding machine includes a contact shield, and the positioning device comprises a positioning ring associated with a material to be welded, wherein the positioning ring can be fixed to the material to be welded and the contact shield can be inserted in the positioning ring to transfer an applied pressure to the material to be welded and wherein the positioning ring has a borehole, the dimensions of which correspond to the contact shield.

2. The positioning device as in claim 1, the positioning ring is configured as a vacuum ring and has at least one vacuum connector for connecting to a vacuum pump and a plurality of suction feet that can be fixed by negative pressure to the material to be welded.

3. The positioning device (203) as in claim 1, wherein the positioning ring has a circumferential suction ring that can be fixed to the material to be welded by negative pressure via a vacuum connector.

4. The positioning device as in claim 1, wherein the positioning ring has a radial recess in which a flange disc can be inserted in order for the pressure to be transferred through the contact shield.

5. The positioning device as in claim 4, wherein the flange disc is directly joined to the manual welding machine.

6. The positioning device as in claim 1, further comprising: a plurality of flange discs, wherein a first of the plurality of flange discs is attachable to the manual welding device and wherein another of the plurality of flange discs is configured as a guide for guiding the contact shield to the material to be welded.

7. The positioning device as in claim 6, wherein the plurality of flange discs are each connected to one another by a paired bearing element that form a pivot axis.

8. The positioning device as in claim 6, wherein the pivot axis of the first and a second of the plurality of flange discs and the pivot axis of the second and a third of the plurality of flange discs are arranged offset from one another by 90°.

9. The positioning device as in claim 7, wherein each bearing element includes at least two bearing shells with a bearing pin, wherein the bearing pin is secured by a protruding collar and a cotter pin.

10. The positioning device as in claim 6, wherein the plurality of flange discs are each connected to one another by hydraulic pistons.

11. The positioning device as in claim 6, wherein the plurality of flange discs are connected to one another by a circular hose, wherein the hose is filled with an at least partially incompressible medium.

12. The positioning device as in claim 6, wherein a hose filled with incompressible fluid is arranged between the another flange disc and the contact shield and wherein the hose is connected to the contact shield and the another flange disc.

13. The positioning device as in claim 6, wherein the another flange disc configured as a guide is directly joined to the contact shield, to passage of electromagnetic radiation to the material to be welded.

14. The positioning device as in claim 1, wherein the contact shield has at least partially rubber-elastic pads on the outer side provided for support and/or wherein the contact shield (has radially outside-lying and/or radially inside-lying compensation elements.

15. The positioning device as in claim 1, wherein the contact shield is configured as an aperture mask with annularly arranged segment-like apertures or wherein the contact shield includes an electromagnetic radiation-permeable material and/or wherein the contact shield consists of metal with an annular gap and connector bars or the contact shield consists of a circular ring.

* * * * *